UNITED STATES PATENT OFFICE.

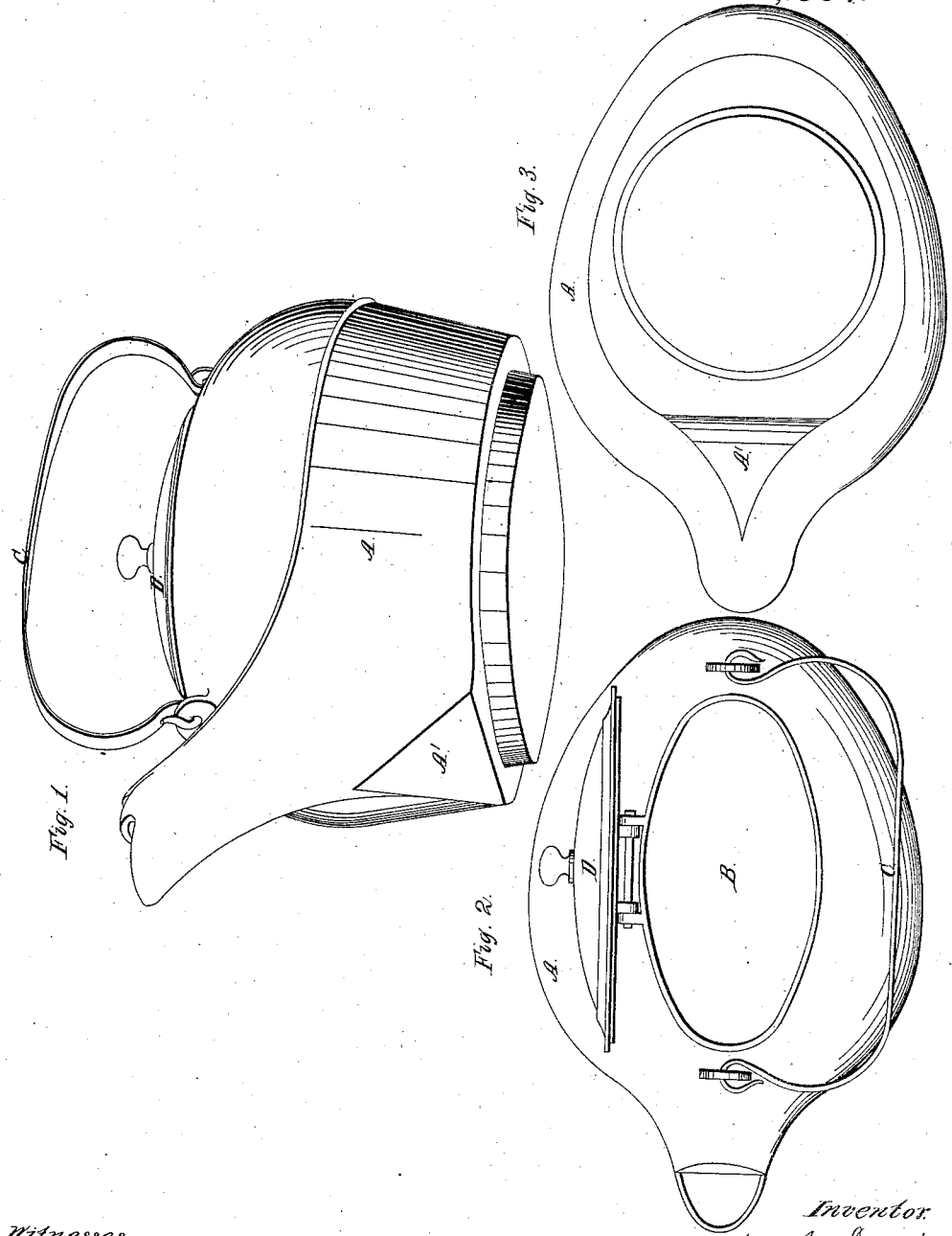

WILLIAM C. DAVIS, OF CINCINNATI, OHIO.

IMPROVEMENT IN TEA-KETTLES.

Specification forming part of Letters Patent No. 41,492, dated February 9, 1864.

*To all whom it may concern:*

Be it known that I, WILLIAM C. DAVIS, of Cincinnati, Hamilton county, Ohio, have invented new and useful Improvements in Tea-Kettles; and I do hereby declare the following to be a full, clear, and exact description thereof, reference being had to the accompanying drawings, making part of this specification.

My invention is particularly designed for cast-iron tea-kettles, and is intended to insure greater safety in filling and pouring, together with greater capacity in a given boiler opening or size of stove.

Figure 1 is an under side and front view of a kettle embodying my improvements. Fig. 2 is a top view thereof. Fig. 3 is a bottom view.

My kettle-body A, in its horizontal section or contour, is egg-formed—that is, to say, it has at the place of greatest width the shape of an irregular oval, which is widest toward the spout end.

The breast of my kettle is somewhat flattened at its lower portion, so as to present a straight salient angle or edge, A'.

The opening B may have the form of an ellipse whose major axis is in the vertical plane of that of the kettle-body.

The bail C is hinged to the body in the vertical plane of its principal axis.

The lid D may be hinged to the body in the manner represented or may be unconnected.

Among the obvious advantages of my improvements may be cited: The center of gravity of the kettle being near its front end, and its front lower portion having a broad, straight bearing, the kettle may be poured from by simply tipping without lifting it, free from the danger of canting over and scalding the user, which has been the cause of so many distressing casualities in the hands of children and others. The oval form of body enables a much larger kettle on a given size of stove than is practicable with those of circular contour, because the kettle may be easily disposed on the stove-top so as to accommodate the other vessels. The elliptical opening facilitates filling the kettle without spilling water on the hot stove-top, by which the top is so frequently cracked.

I claim herein as new and of my invention—

1. The provision of a straight edge or bearing, A', at the bottom of the breast, as and for the purposes explained.

2. The combination of the straight edge or bearing A' with a body, A, of elliptical form, substantially as described.

3. The combination of the elliptical body A, longitudinal bail C, and side hinged cover, D, all as herein shown and described.

In testimony of which invention I hereunto set my hand.

W. C. DAVIS.

Witnesses:
GEO. H. KNIGHT,
CHARLES L. FISHER.